W. R. CLARK.
Shaft Coupling for Two-Wheeled Vehicles.

No. 231,212. Patented Aug. 17, 1880.

Attest:
A. Barthel.
Chas. J. Hunt.

Inventor
W. R. Clark,
By Atty
Thos. S. Sprague

United States Patent Office.

WILLIAM R. CLARK, OF DETROIT, MICHIGAN.

SHAFT-COUPLING FOR TWO-WHEELED VEHICLES.

SPECIFICATION forming part of Letters Patent No. 231,212, dated August 17, 1880.

Application filed January 28, 1880.

*To all whom it may concern:*

Be it known that I, WILLIAM R. CLARK, of Detroit, in the county of Wayne and State of Michigan, have invented a new and useful Shaft or Pole Coupling for Two-Wheeled Vehicles, of which the following is a specification.

The nature of my invention relates to certain new and useful improvements in the construction of couplings for attaching shafts or poles to carts or other two-wheeled vehicles.

As poles or shafts are ordinarily connected to vehicles of this class, their connection is made rigid for the purpose of sustaining the front of the vehicle and enabling it to be properly guided, and every movement of the horse is communicated to the cart and its occupant, and in consequence, when the vehicle passes over an obstruction an unpleasant jar is imparted to the whole device, to the discomfort of the driver, while a considerable strain is brought upon the saddle and harness connections.

This invention consists in the peculiar construction of a bracket which is rigidly secured to the body or sill of the cart, to which are pivotally clipped the shafts or pole, and provided with a spring or springs, all as more fully hereinafter set forth.

Figure 1:
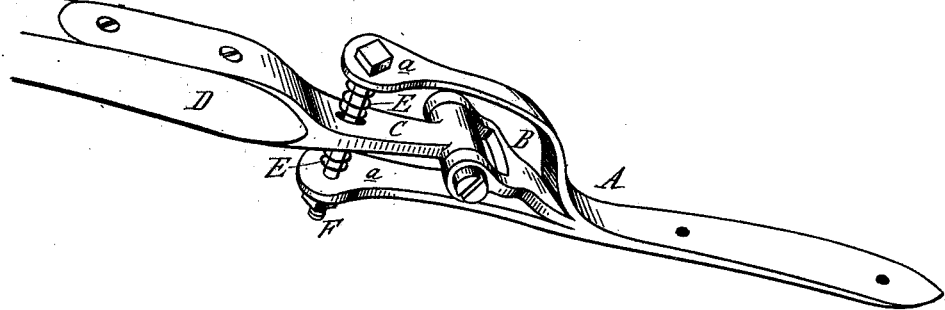
Figure 2:
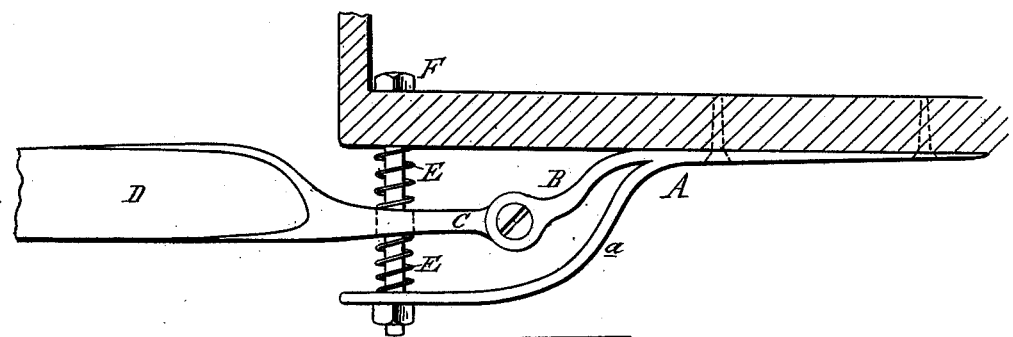
Figure 3:
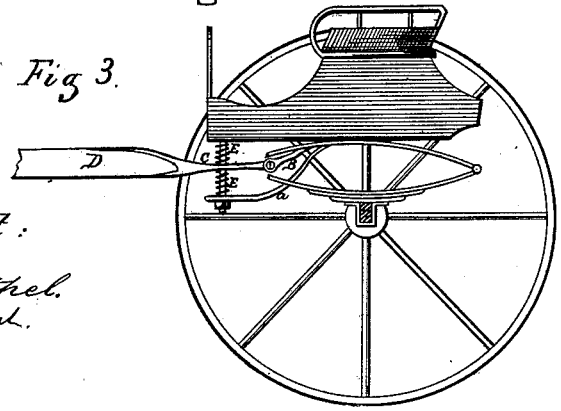

Figure 1 is a perspective view of my improvement; Fig. 2, a side view of a modification thereof, and Fig. 3 a side elevation of a carriage with my improvement attached.

A represents a bracket, which is rigidly secured to the body of the cart. Between the two arms *a a* of this bracket is the clip B, which is preferably cast or forged with and forms a part of the bracket.

When in use the bracket A is rigidly secured to any convenient part of the body of a two-wheeled vehicle, but preferably the bottom and near the front, and the shaft D is attached to the clip-iron C, as shown.

C represents the clip-iron in the inner end of the pole or shaft D, which is pivotally secured in the clip B in the ordinary manner. A bolt, F, passes through the outer ends of the arms *a* of the bracket and through an elongated opening in the iron C. Around this bolt F, and upon both sides of the clip-iron C, are placed coiled springs E, one above and one below.

By the use of a coupling constructed as herein described the rigid connection between the propelling power and the body or gearing of the cart is broken, while the body is held in its position by the springs or elastic bearings, which allow it to have an easy rocking motion to compensate for the motion of the horse, or when passing over an obstruction; at the same time all sudden strain is taken off the harness-saddle fastenings.

In case the pole or shaft should be broken it can readily be removed and replaced by a new member at slight cost.
Fig. 2 shows a modification of the above-described coupling wherein the upper arm of the bracket is omitted, the body of the cart answering therefor, and in some cases would be the preferable construction.

What I claim as my invention is—

1. The combination, with the body and shaft or pole of a two-wheeled vehicle, of a bracket to be attached to the body and an iron to receive the shaft, the two being united by a yielding joint, with a spring or springs arranged to limit both upward and downward movement, substantially as specified.

2. A coupling for two-wheeled vehicles, consisting of a bracket, A, clip B, and clip-iron C, in combination with a spring or springs, E, interposed between such bracket and the clip-iron, substantially as and for the purposes set forth.

WILLIAM R. CLARK.

Witnesses:
H. S. SPRAGUE,
CHAS. J. HUNT.